April 16, 1935.   W. E. TWAMLEY   1,997,841
GEAR SELECTING AND SHIFTING MECHANISM
Filed May 15, 1933   3 Sheets-Sheet 3
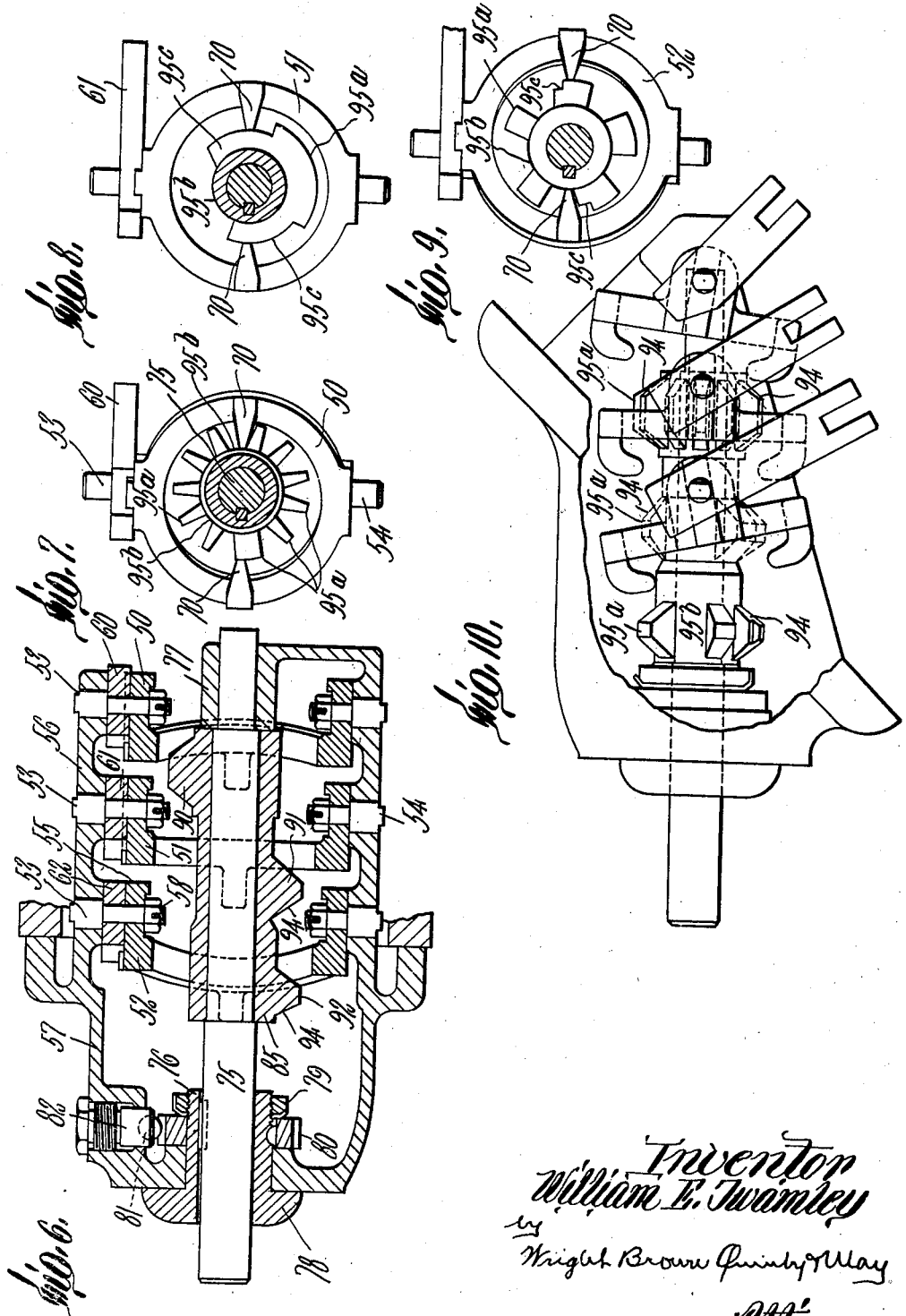

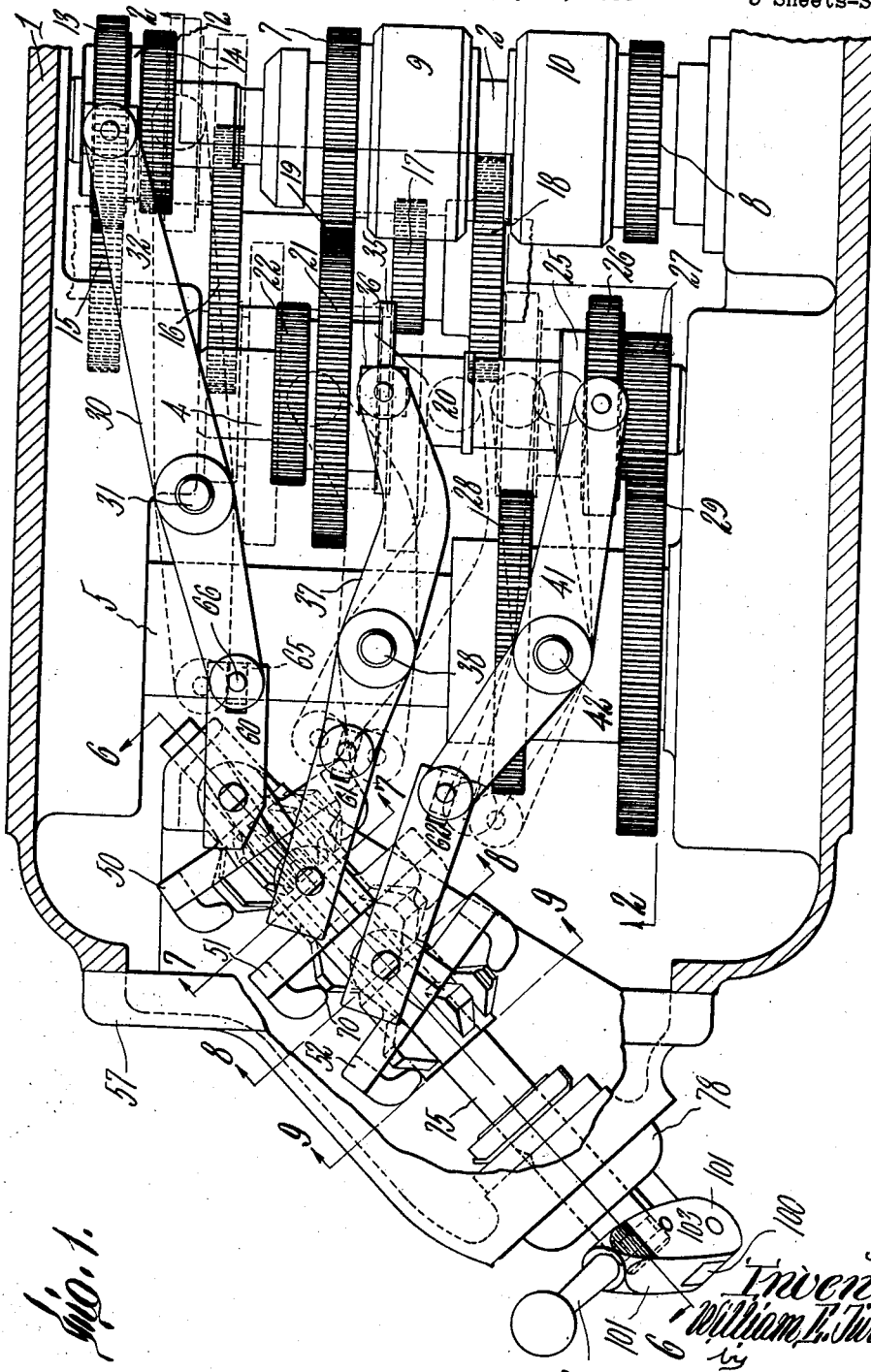

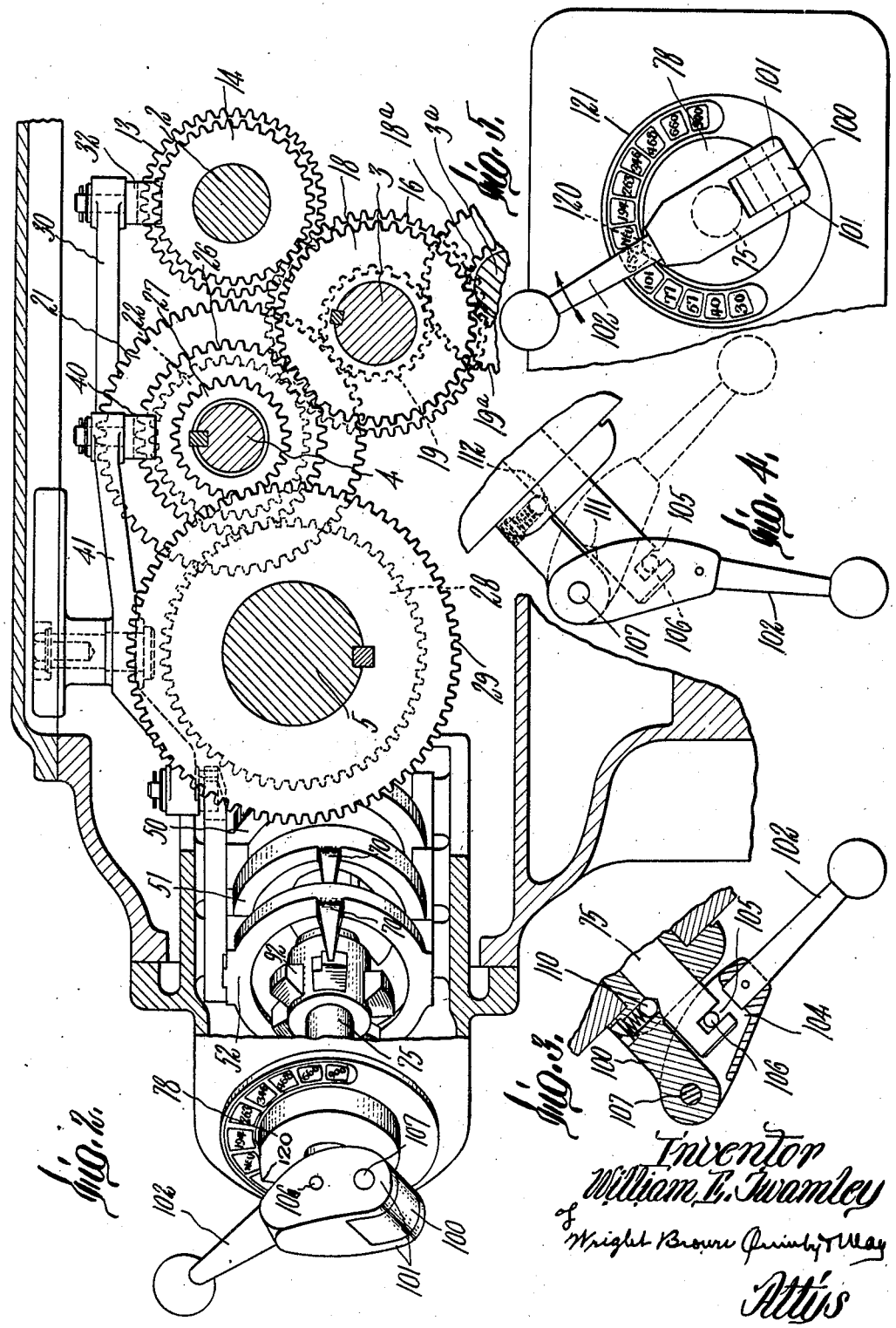

Patented Apr. 16, 1935

1,997,841

UNITED STATES PATENT OFFICE 1,997,841

GEAR SELECTING AND SHIFTING MECHANISM

William E. Twamley, Charlestown, N. H., assignor to Jones & Lamson Machine Company, Springfield, Vt., a corporation of Vermont Application May 15, 1933, Serial No. 671,033

10 Claims. (Cl. 74—334)

This invention relates to gear selecting and shifting mechanism in which a very considerable number of gear ratios may be obtained without requiring removal and replacement of gears, and by which the particular ratio desired may be obtained expeditiously and without requiring computation or the use of gear tables. A series of selectively meshing gears are employed together with selecting mechanisms therefor, and a common controller and actuator for the mechanisms by which they are automatically set in proper relation one to the other to produce the desired ratio in accordance with indications on a dial. Besides controlling the intermeshing of various gears the selector mechanism may also control other actions such as starting and stopping or reversing if desired.

One of the objects of this invention is to provide a single shift mechanism which carries the various selectors each of which is used to control the position of a shifting mechanism.

Another object is to provide a construction which is self locking so that when set for any selected speed it will so remain as long as desired.

For a more complete understanding of this invention, reference may be had to the accompanying drawings, in which,—

Figure 1 is a view partly in elevation and partly broken away and in section of a mechanism embodying this invention.

Figure 2 is a fragmentary view partly in elevation and partly in section transverse to the plane of Figure 1.

Figure 3 is a detail section through the selector control device.

Figures 4 and 5 are fragmentary side and end elevations respectively of the same.

Figures 6 to 9 are detail sections on the correspondingly numbered section lines of Figure 1.

Figure 10 is a fragmentary view showing the selectors and rockers in elevation, the selectors being in inoperative positions.

Referring first to Figures 1 and 2, at 1 is indicated a frame of any suitable type within which are journalled shafts such as 2, 3, 3a, 4 and 5. The shaft 5 may be, for example, the drive spindle of a lathe or other machine tool, the speed of which it is desired to selectively control. Loosely mounted on the shaft 1 are shown a pair of gears 7 and 8 which are arranged to be driven in opposite directions by any suitable gears (not shown) meshing therewith. At 9 and 10 are conventionally indicated clutch devices by actuation of which either selected gear 7 or 8 may be coupled to the shaft 2 to rotate this shaft in the desired direction. The shaft 2 has slidably keyed thereto a sleeve 12 having gear portions 13 and 14 thereon of different diameters. This sleeve 12 may be moved axially so that the gear 13 may mesh with the gear 15 secured to the shaft 3, or the gear 14 may be meshed with the gear 16 also secured to the shaft 3, thus to drive the shaft 3 from the shaft 2 at either of two somewhat different speeds. The shaft 3 also has loose thereon, but secured together, gears 17 and 18, and a gear 19 of the same size as the gear 17 is fixed on the shaft 3.

The shaft 4 has slidably keyed thereto a sleeve 20 to which are fixed the gears 21 and 22. By sliding the sleeve 20 to its extreme left hand position the gear 22 is brought into mesh with the gear 16 on the shaft 3. In the intermediate position of the sleeve 20, shown in Figure 1, the gear 21 is in mesh with the gear 19 fixed on the shaft 3, and in the extreme right hand position of the sleeve 20 the gear 21 is in mesh with the gear 17 journalled on the shaft 3. A gear 19a fixed to the shaft 3a (see Figure 2) is in mesh with the gear 19 so as to be driven by the shaft 3; and a gear 18a fixed to this shaft 3a is in mesh with the gear 18. These gears 18, 18a and 19, 19a are of such relative sizes that the gear 17, while of the same size as the gear 19, is driven at a somewhat lower speed. Thus, the shaft 4 may be driven at two different speed ratios relative to the shaft 3 from the gears 16 and 19 thereon and at a still different ratio from the gear 17, and this shaft 3 in turn may be driven at either of two speed ratios from the shaft 2. The shaft 4 also carries slidably keyed thereto a sleeve 25 to which are fixed the gears 26 and 27 of different diameters. In the extreme left hand position of the sleeve 25 the gear 26 meshes with a gear 28 fixed to the shaft 5, and in the extreme right hand position, as shown in Figure 1, the gear 27 meshes with the gear 29 also fixed to the shaft 5, while in an intermediate position of the sleeve 25 both the gears 26 and 27 are out of mesh with the corresponding gears on the shaft 5, this intermediate position being a neutral position where the shaft 5 is not rotated.

The position of the sleeve 12 on the shaft 2 is determined by the angular position of a lever 30 fulcrumed at 31 to the frame 1 and carrying at one end a forked guiding shoe 32 which is formed to straddle the gear 13. The sleeve 20 is shown as provided with a rim 35 which is similarly straddled by a shoe 36 pivoted to one end of a lever 37 fulcrumed at 38 to a suitable part of the machine frame. The sleeve 25 is arranged to be moved by movement of a shoe 40 which straddles the gear 26 and which is pivotally carried at one end of a lever 41 fulcrumed at 42 to a suitable part of the machine frame. These three levers and the sleeves controlled thereby constitute the shift devices by which the speed ratio of the shaft 5 to the driving shaft 2 is determined, it being evident from the various possible drive combinations that a large number of different speed ratios are possible, there being twelve driving combinations of the shift devices and a neutral position where the shaft 5 is not driven. Mechanisms for selectively moving and controlling the shift devices will now be described.

The position of each of these shift devices is controlled by a rocker as 50, 51 and 52. Each of these rockers 50, 51 and 52 is formed as a ring and has at diametrically opposite points journals 53, and 54. As shown in Figure 6 the journals 53 are formed as portions of bolts which pass through ears 55 extending from the rockers, the outer ends being journaled in a frame member 56 which forms a part of a gear casing cover 57. The inner ends of these journal members are threaded for the reception of nuts 58 for securing the journal members in position. The journals 54 are similarly constructed except that they are shorter than the journal members 53 which are extended to make room for the securement of arms 60, 61 and 62 to the respective rockers between these rockers and the frame piece 56, these arms being keyed to their respective rockers to move angularly therewith. Each of these arms is pivotally secured at its opposite end to one of the levers 30, 37 and 41, as by means of a shoe 65 riding in a slot in the outer end of its respective arm and secured as by a pivot 66 to the end of its respective lever. In a plane substantially at right angles to the pivotal mounting of these rockers each is provided with a pair of diametrically disposed inwardly extending fingers 70 presenting oppositely disposed facing ends which are arranged to be contacted and moved by faces of selectors carried by a rockably and axially movable shaft 75 which passes through the ring portions of the rockers and is journalled and axially slidable at its ends in bearings 76 and 77 (see Figure 6). The bearing 76 comprises a bushing 78 keyed to rotate with the shaft 75 and held against axial motion by means of a nut 79 threaded on its inner end and bearing against a collar 80 keyed to the bushing and which in turn bears against the inner face of the cap member 57. In order to yieldingly retain the shaft 75 in any selected of a series of definite angular positions, the collar 80 is shown as provided with a toothed periphery against which bears a detent ball 81 yieldingly supported in a plug member 82 which may be threaded into a side portion of the frame member 57. Three selectors, one for each rocker, are employed, each presenting a series of selector faces arranged in circumferential array about the axis of the shaft 75. As shown in Figure 6, all of these selector faces may be integral with a sleeve 85 secured to the shaft 75. Each series of selector faces is arranged to cooperate with one of the rockers, the inner end series at 90 cooperating with the fingers 70 of the rocker 50, the intermediate series at 91 cooperating with the fingers 70 of the rocker 51, and the third series at 92 cooperating with the fingers 70 of the rocker 52.

As shown best in Figure 7, the selector faces of the series 90 are arranged in oppositely disposed pairs, one high 95a and one low 95b, so spaced as to permit them to be passed between the fingers 70 of the rocker 50 when they are arranged in the plane transverse to the end faces of these fingers to hold it in either of two angular positions which represent the two operative positions of the corresponding shift device. As shown in Figure 7 the right hand finger 70 of the rocker 50 rests against a low face 95b projecting a relatively short distance from the axis of the shaft 75, while the finger 70 rests against a high face 95a more remote from the axis of the shaft 75. By withdrawing the shaft 75 axially so as to bring all the fingers 70 out of contact with their respective selector faces, the shaft 75 may be rotated to any desired angular extent and then moved axially back into engaging position with their respective rockers. The ends of the selector elements which project outwardly from the surface of the sleeve 85 are inclined as at 94, so as to form inclined planes upon which the fingers 70 may ride onto the selector faces which are substantially parallel with the axis of the shaft 75, and lie in substantially cylindrical surfaces coaxial therewith and bridge the space between their fingers. Since the motion of the shaft 75 to withdraw these elements is thus substantially at right angles to the motion of the fingers 70 as the rockers move, the whole mechanism is self locking, any pressure on the rockers tending to move them from their operative positions being ineffective to move the shaft 75 to permit motion of the rockers. In some of these angular positions the fingers 70 of the rocker 50 will so engage the selector faces as to turn this rocker 50 to its other angular position, the left hand finger 70 of Figure 7 engaging against a lower or smaller diameter face 95b, and the right hand finger 70 engaging a higher or larger diameter face 95a.

Similarly, the series of selector faces 91 may be provided as shown in Figure 8 with faces at three different elevations as at 95a, 95b and 95c so that the rocker 51 may be held in any one of three different angular positions corresponding to the three positions of its shift device. Likewise, the selector series 92 is provided with selector faces at three elevations 95a, 95b and 95c corresponding to the three possible positions of the corresponding shift device, one of these positions, where the faces 95c are in angular relation to engage the fingers 70 of the rocker 52 corresponding to the neutral position of the third selector mechanism where there is no rotation imparted to the shaft 5.

It will thus be seen that by properly arranging the various selector faces of the series and choosing the angular position of the shaft 75, many various combinations of shift device positions can be produced so as to produce the corresponding changes in gear ratio with corresponding changes in driven speed of the shaft 5. In order to determine and control such selection, the bushing 78 is shown as provided with an outwardly extended portion 100 to which is pivoted the forked extremity 101 of a hand lever 102, this hand lever as shown being formed in two parts, the inner of which 103 is recessed at 104 to receive the outer end of the shaft 75. Adjacent to the outer end of this shaft there is formed therein a transverse slot 105 within which rides a pin 106 extending across the handle member 104 so that as the handle 102 is swung about its fulcrum 107 on the portion 100, the shaft 75 is moved axially. A spring ball detent at 110 engaging in either of a pair of notches 111 and 112 in the shaft 75 serves to yieldingly hold this shaft in either of its axial positions, in the inner of which the selectors are in controlling relation to their respective rockers, and in the outer of which these selectors are out of engagement therewith. When out of engagement therewith, the handle 102 may be turned about the axis of the bushing 78 thus to rotate the shaft 75 so as to bring any selected faces of the selectors into the proper angular position to cooperate with the rockers when the handle 102 is again rocked inwardly. The bushing 78 may be provided with an indicator pointer 120 cooperating with a scale 121 carried at the end of the frame cap 57, thus to indicate to the operator by the markings on the scale 121 the speed of the shaft 5 corresponding to the normal driving speed of the shaft 2 for any given angular position of the selectors.

From the foregoing description of an embodiment of this invention, it will be evident to those skilled in the art that various changes and modifications might be made without departing from the spirit or scope of this invention as defined by the appended claims.

I claim:

1. In combination, a plurality of shift devices, a rocker for controlling and shifting each of said devices, a rockable and axially movable shaft, a series of selector elements for each of said devices fixed to said shaft, and means for selectively presenting said selector element to said rockers by rocking of said shaft to selected angular positions and then by axial motion of said shaft into controlling relation to said rockers.

2. In combination, a plurality of shift devices, a member movable to control each of said devices and having a pair of oppositely positioned end faces, a series of selector elements for each of said devices rockable to selectively present any selected pair of elements in a plane transverse to the faces of its respective member and axially movable from and to a position between and bridging said faces, and means for moving said devices.

3. In combination, a plurality of shift devices, a member movable to control each of said devices and having a pair of oppositely positioned end faces, a series of selector elements for each of said devices rockable to selectively present any selected pair of elements in a plane transverse to the faces of its respective member and axially movable from and to a position between and bridging said faces, and a member operatively connected to all of said selector elements movable to select said elements and to move them into and out of bridging positions.

4. In combination, a plurality of shift devices, a rocker for controlling and shifting each of said devices, a rockable and axially movable shaft, and a series of selector elements for each of said devices carried by said shaft, each of said selector elements having a face presented outwardly from the axis of said shaft and each of said rockers having a pair of portions directed toward said shaft axis for engagement with the faces of oppositely disposed selector elements to thereby control the angular postion of said rockers when said selector elements are positioned between said portions, and means for moving said shaft axially to bring each series of selector elements into or out of controlling relation to its respective rocker and for rocking said shaft to bring the desired selector elements of each series into operative angular positions.

5. In combination, a plurality of shift devices, a rocker for actuating each of said devices, each rocker comprising a ring provided with oppositely disposed journal portions and a pair of inwardly extending fingers arranged substantially perpendicular to the journal axis, a rockable and axially movable shaft extending through said rings and provided with a series of circumferentially arranged selector elements for each rocker movable between and away from the corresponding pair of fingers, to move and hold said rings in desired angular positions when said shaft is in one axial position and to free said rockers when said shaft is moved axially from said position, and means actuable to rock said shaft to bring selected of said faces into operative angular positions and to move said shaft axially to and from said axial position.

6. In combination, a shift device, a member movable to actuate said device and having a pair of portions provided with spaced ends facing each other, a selector, and means for moving said selector from and to a position between and bridging said ends for determining the position of said member.

7. In combination, a shift device, a member movable to actuate said device and having a pair of elements spaced in the general direction of motion of said member, said elements having oppositely facing portions, and a selector movable in a direction substantially at right angles to the direction of motion of said member from and to a position between and bridging said portions for determining the position of said member.

8. In combination, a shift device, a member movable to shift said device and having a pair of elements spaced angularly about the rocking axis of said member, said elements having oppositely facing portions, and a part movable from and to a position between and bridging said portions to fix the angular position of said member when said part is in bridging position.

9. In combination, a shift device, a member rockable to shift said device and having a pair of elements spaced angularly about the rocking axis of said member, said elements having oppositely facing portions, and a part movable from and to a position between and bridging said portions to fix the angular position of said member when said part is in bridging position, said part having a plurality of sets of portion-engaging faces selectively positioned between said portions and acting in accordance with such selection to hold said member in one of different angular positions when said part is in bridging position.

10. In combination, a shift device, a member rockable to shift said device and having a pair of elements spaced angularly about the rocking axis of said member, said elements having oppositely facing portions, and a part movable from and to a position between and bridging said portions to fix the angular position of said member when said part is in bridging position, said part having a plurality of sets of portion-engaging faces angularly disposed with reference to the direction of motion of said part from and to said bridging position and disposed at different distances from said axis to cause said part to retain said member in any of a plurality of angular positions depending on the set of faces presented between said portions when said part is in bridging position.

WILLIAM E. TWAMLEY.

DISCLAIMER 1,997,841.—*William E. Twamley*, Charlestown, N. H. GEAR SELECTING AND SHIFTING MECHANISM. Patent dated April 16, 1935. Disclaimer filed January 24, 1942, by the assignee, *Jones & Lamson Machine Company*.

Hereby enters this disclaimer to claim 1 in said specification.

[*Official Gazette February 17, 1942.*]